(12) United States Patent
Menardo et al.

(10) Patent No.: US 8,122,914 B2
(45) Date of Patent: Feb. 28, 2012

(54) CRYOGENIC TRANSFER HOSE HAVING A FIBROUS INSULATING LAYER AND METHOD OF CONSTRUCTING SUCH A TRANSFER HOSE

(75) Inventors: Philippe Albert Christian Menardo, Nice (FR); Jean-Pierre Queau, Nice (FR)

(73) Assignee: Single Buoy Moorings Inc., Marly (CH)

( * ) Notice: Subject to any disclaimer, the term of this patent is extended or adjusted under 35 U.S.C. 154(b) by 180 days.

(21) Appl. No.: 12/518,397

(22) PCT Filed: Dec. 7, 2007

(86) PCT No.: PCT/EP2007/063524
§ 371 (c)(1),
(2), (4) Date: Jun. 9, 2009

(87) PCT Pub. No.: WO2008/071637
PCT Pub. Date: Jun. 19, 2008

(65) Prior Publication Data
US 2010/0024911 A1     Feb. 4, 2010

(30) Foreign Application Priority Data
Dec. 11, 2006   (EP) ..................................... 06125841

(51) Int. Cl.
*F16L 9/14*          (2006.01)
(52) U.S. Cl. .......................... 138/114; 138/149; 138/148
(58) Field of Classification Search ................... 138/149, 138/148, 112–114, 109
See application file for complete search history.

(56) References Cited

U.S. PATENT DOCUMENTS

| | | | |
|---|---|---|---|
| 2,824,364 A | 2/1958 | Bovenkerk | 445/25 |
| 2,930,407 A * | 3/1960 | Conley et al. | 138/114 |
| 3,473,575 A * | 10/1969 | Vogelsang et al. | 138/149 |
| 3,490,496 A | 1/1970 | Stearns | 138/112 |
| 3,547,161 A * | 12/1970 | Boyle et al. | 138/114 |
| 3,595,275 A | 7/1971 | Steans et al. | 138/114 |
| 3,698,440 A * | 10/1972 | Matthieu et al. | 138/149 |
| 3,809,128 A | 5/1974 | Tateisi et al. | 138/114 |
| 4,162,093 A * | 7/1979 | Sigmund | 285/47 |
| 4,303,105 A * | 12/1981 | Rohner | 138/149 |
| 4,531,552 A * | 7/1985 | Kim | 138/149 |
| 4,581,804 A | 4/1986 | McLaughlin | 29/451 |
| 5,896,895 A * | 4/1999 | Simpkin | 138/149 |
| 6,186,181 B1 | 2/2001 | Schippl | 138/112 |
| 6,779,368 B2 | 8/2004 | Rock et al. | 66/191 |
| 6,883,549 B2 * | 4/2005 | Schippl | 138/114 |
| 2003/0003264 A1 | 1/2003 | Rock et al. | |

FOREIGN PATENT DOCUMENTS

| | | |
|---|---|---|
| GB | 1190734 | 5/1970 |
| WO | 0196772 | 12/2001 |
| WO | 2005058573 | 6/2005 |

OTHER PUBLICATIONS

International search report in corresponding PCT/EP2007/063524.

* cited by examiner

*Primary Examiner* — Patrick F Brinson
(74) *Attorney, Agent, or Firm* — Young & Thompson

(57) ABSTRACT

Cryogenic transfer hose for hydrocarbons comprising an inner hose, an outer hose arranged around the inner hose in a concentric manner and a spacer member bridging an annular gap between the inner and outer hoses, a fibrous insulation material forming a three dimensional matrix of fibers being comprised in the annular gap, characterized in that the outer hose comprises an elastomeric and/or a plastic material, the fibrous material being contiguous overall best a part of the length of the hoses with the inner and outer hose and forming a spacer member.

26 Claims, 13 Drawing Sheets

Figure 1:
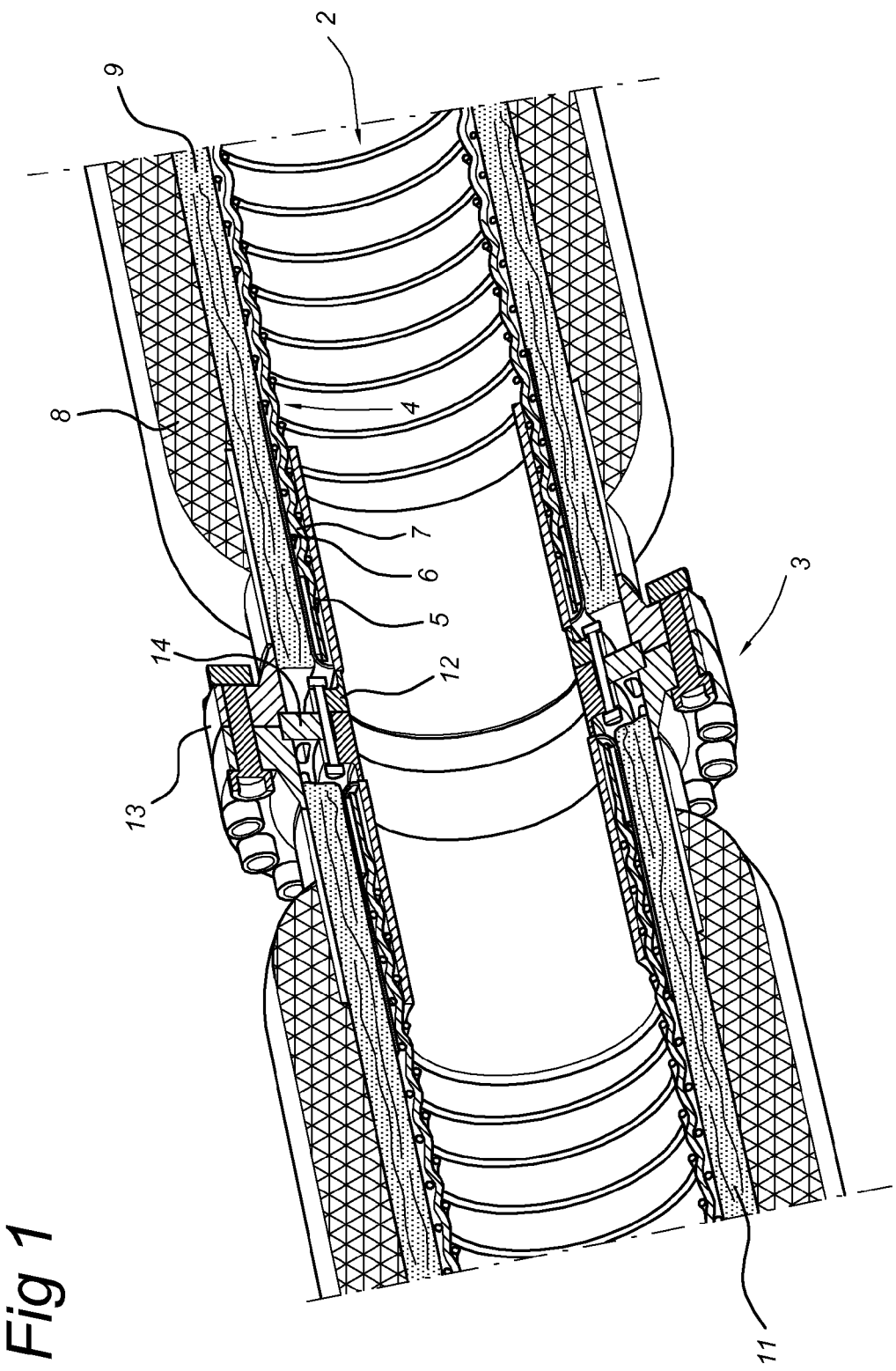

CRYOGENIC TRANSFER HOSE HAVING A FIBROUS INSULATING LAYER AND METHOD OF CONSTRUCTING SUCH A TRANSFER HOSE

The invention relates to a cryogenic transfer hose for hydrocarbons comprising an inner hose, an outer hose arranged around the inner hose in a concentric manner and a spacer member bridging an annular gap between the inner and outer hoses, a fibrous insulation material forming a three dimensional matrix of fibres being comprised in the annular gap. The invention also relates to a fibrous insulation material for use in such a cryogenic transfer hose and to a method of constructing an insulated cryogenic transfer hose.

A cryogenic transfer hose of the above-mentioned type is known from U.S. Pat. No. 6,186,181.

U.S. Pat. No. 6,186,181, in the name of Alcatel, discloses a flexible pipe for transfer of cryogenic hydrocarbons at temperatures around −160° C., which pipe comprise an inner corrugated metal tube, an outer corrugated metal tube located at some distance from the inner tube and a spacer, as well as an insulation material between the inner and the outer metal tubes. The spacer comprises two cords made of fibre-reinforced plastic applied to the inner tube and wrapped in opposite directions. In the ring-shaped gap between the corrugated metal inner and outer tubes a vacuum of between $10^{-3}$ and $10^{-1}$ mbar is created. The insulation material in the gap is formed by a fleece material which provides a three-dimensional matrix of fibres. Fleece material is used instead of solid insulation materials or multi layered compressed materials as such fleece material combines low heat transfer capacities (a good insulator) with the possibility of a quick evacuation of the gap between the two metal corrugated tubes. Evacuation or under pressurization of the gap is preferred above the use of a super-insulation material in the gap, as evacuation optimally isolates the highly conductive outer corrugated metal tube from the highly conductive inner corrugated metal tube.

The use of a vacuum within an outer metal corrugated tube for LNG transfer could create a potential hazardous situation when loss of vacuum occurs and/or upon water ingress via openings or cracks in the welds of the neighbouring corrugated helical strips of the outer tube. These types of corrugated tubes may be acceptable when used as aerial hoses in a more static environment but can be hazardous when used in an offshore environment as aerial, floating or submerged LNG transfer hoses due to the danger of seawater ingress in the openings or (micro-) cracks at the welds. Especially in a dynamic and wet offshore situation the outer tube is subject to constant bending and stretching forces caused by wind, waves and movements of the floating structures to which the hose is attached, which can easily lead to small cracks in the welds and a loss of vacuum. The bend radius of a LNG transfer system with corrugated inner and outer tubes is further relatively large, which does not comply with the waves and should be controlled and restricted at all times to avoid situations were the tube could be overstretched as this will lead to permanent deformations of the outer tube and creation of openings or cracks in the outer corrugated tube.

Another disadvantage of the continuous LNG transfer system of U.S. Pat. No. 6,189,181 is that in case of a local crack in the continuously made inner or outer metal corrugated tube, the complete system needs to be dismantled and replaced with a complete new LNG transfer system, which is a rather costly and time consuming operation.

Hence a flexible LNG transfer system is needed which can be used in a dynamic offshore situation, which is protected against any seawater ingress at all times, which has a mall bending radius and which should facilitate easy maintenance and repair activities on the system.

It is an object of the present invention to provide a cryogenic transfer hose which can be used in a dynamic offshore environment, such as in aerial conditions at sea under wind and wave-induced movements, and preferably as a floating or submerged cryogenic transfer hose.

It is a further object of the invention to provide a cryogenic transfer hose which can be easily manufactured, which is reliable in its operation and which can be easily repaired or exchanged.

It is again an object of the invention to provide a method of constructing (i.e. manufacture and/or repair) of a cryogenic transfer hose in which an inner and outer hose can be quickly and accurately aligned, which can be adjusted easily in length.

Hereto the transfer hose according to the invention is characterised in that the outer hose comprises an elastomeric or plastic material, the fibrous material being over at least a part of the length of the hoses contiguous with the inner and the outer hose and forming a spacer member.

The transfer hose according to the invention can also be characterised in that the fibrous material can be added so that on the inner hose areas of different densities are created over the length of the inner hose.

Further the transfer hose according to the invention can also be characterised in that different type of fibrous material can be combined so to create areas over the length of a hose with different spacer characteristics.

The fibrous material radially extends from the inner tube to the outer tube and supports the outer tube at a substantially constant radial position relative to the inner tube. The fibrous material can easily be applied around the inner tube and placed inside the outer hose. As the space between the inner and outer hose is felled with fibrous material, air-convection between the two hoses is minimized or even avoided. The fibrous material can stretch to accommodate environmentally induced elongations or bending and allows a relative shift of the inner and outer hoses following thermally induced contraction and expansion upon use. The fibrous material can take up radial forces exerted on the outer hose and provides a resistance against compression such as to act as a spacer member. The combination of the fibrous material with the elastomeric or plastic outer hose provides for a cryogenic hose which is very flexible and has a relatively small bend radius; the bend radius of the outer hose could be equal to 4 times the diameter of the inner hose. The outer hose is sturdy and resists water ingress, mechanical impacts and is highly insulating. Furthermore, the use of a vacuum in the annular space for insulating purposes can by the combination of the elastomeric or plastic material of the outer hose and the fibrous insulating material be avoided.

Even though other spacer elements may be provided in addition to the fibrous material, in a preferred embodiment over a length of at least 40 cm no other element but the fibrous material extends radially from a contacting position on the inner hose to a contacting position on the outer hose. As the three dimensional matrix of fibrous material by itself provides sufficient resistance against radial compression, the use of spacers along the length of the concentric hoses can be reduced such that heat transfer to the inner tube at the positions of the spacers can be kept to a minimum. In case additional spacers are needed, they can be added at regular distances from each other on top of the compressible fleece material. The spacer can be made from any material but is preferable made from a compact fibrous material with high insulation capacities; like a very compact fleece or more preferred like felt material.

A suitable fibrous material is elastically elongatable in a length direction of the hose by at least 10%. The inter fibre bonding of the fibres in the three dimensional matrix should be relatively strong such as to resist permanent and disruptive elongation.

With "elastically" it is meant that the fibrous material can return to its undeformed state without undergoing a permanent deformation. The elastic spacer properties of the fibrous material are provided by a fibrous layer which is elastically compressible in a radial direction of the hose by at between 1% and 10% of a force on the inner hose of between 5 and 50 kN/m when the outer hose is clamped in a fixed position.

Preferably the fibrous material has a density of 70 kg.m$^{-3}$ and an open volume of 93% such that relatively large amounts of insulating air can be trapped between the fibres. It is possible to wrap the fibrous material and equally distribute it over the inner hose in multiple layers. By adding more layers of the same fibrous material, the layers will be more compressed and stiffer. It is also possible to add at some local areas along the inner hose extra layers of the same fibrous sheet material to create a relative stiff spacer area. This can also be achieved by using for example different wrapping methods. Alternatively, different fibrous materials can be combined on the inner hose; for example multi layers of fleece material can be used only in area's which need to have good insulation and felt material which is much denser than fleece material, can be use in area's to control buckling of the inner hose with respect to the outer hose.

The hose according to the invention is both strong and flexible. The bend radius of the outer hose is four times the diameter of the inner hose. The outer hose provides both flexibility and heat insulation as it has a heat transfer coefficient of between 0.1 and 10 $Wm^{-1}K^{-1}$, preferably between 0.1 and 1 $Wm^{-1}K^{-1}$.

The fibrous material may be surrounded by an airtight bag, cylinder or layer between the outer hose and the fibrous material. This allows the fibrous layer upon insertion of the inner hose with wound thereon the fibrous layer, to be compressed by evacuation of the airtight layer and to be inserted into the inner hose at a reduced diameter. Removal of the under pressure in the airtight layer causes the fibrous layer to expand and to fill the annular gap between inner hose and outer hoses. In case additional, for example ring shaped spacers made from compact felt material, are added on top, placed within or placed under the fibrous fleece material at regularly spaced distances along the inner hose, the airtight bag can be added over the fibrous material and the spacers. Alternatively the spacers can be added on top of the airtight bag which surrounds the fibrous material.

A preferred fibrous material with good mechanical strength, elastic elongation properties and thermal insulation capacity comprises a fleece material. The fleece material may be a strip-shaped fibrous sheet material which is wound around the inner hose.

The outer hose preferably comprises a fibre and/or metal reinforced elastomeric and/or a plastic material such as to have a large degree of flexibility, impact resistance and water and gas-tightness. The outer hose protects the inner tube against seawater, potential impacts, etc. and can be a standard floating oil offloading hose which is normally made of composite, elastomeric or plastic material with a thick wall, for example a wall thickness of between 3 cm and 15 cm. The outer hose with its low heat transfer coefficient also forms a heat barrier between the inner flexible conduit and the environment. The inner hose can be any type of hose suitable for transferring cryogenic fluids like multilayer composite wire reinforcement hoses, corrugated steel flexible pipes, smooth bore cryogenic hoses, etc. The pressure between the inner and outer hose may be substantially equal to the pressure outside the outer hose.

The fibrous minimum heat loss spacer means of the present invention maintain the inner and outer flexible hoses in a radially spaced relationship while accommodating differential lengthwise thermal contraction of the hoses and without lessening the flexibility of the overall tubing. The fibrous minimum heat loss spacer can be combined with additional spacers preferable made of a more dense fibrous material like felt material. The outer flexible hose is a hose made of a composite, elastomeric or plastic material which has a low heat transfer conductivity. The outer hose can be a standard elastomeric (rubber) hose or a plastic hose, for example made of Kevlar-reinforced ethyl propylene.

The inner flexible tube is preferably a LNG transfer hose, for instance of the type as disclosed in WO 01/96772 in the name of BHP Petroleum showing a flexible multilayer hose arranged between an inner and outer helically wound wire. This hose can be provided with an additional outer tube like a braid, a net, a stockinet, etc. which resists elongation of the multilayer hose die to the internal pressure of the cryogenic fluid. Alternatively, the inner flexible hose can be a corrugated pipe as mentioned in U.S. Pat. No. 6,189,181 which can be provided with additional (fibre) amour layers or the inner flexible hose can be a smooth bore cryogenic hose made of Fluorinated Ethylene-Propylene (FEP) tube.

The material of the flexible outer hose and the three-dimensional matrix of fibrous insulating spacer material function together so that when the entire assembled LNG transfer system is repeatedly bent and stretched in a dynamic offshore environment over and over again, the flexibility and proper functioning of the system is maintained.

Due to this combination of an inner LNG conduit, a fibre based insulating material and the highly flexible, insulating and protective capacities of the elastomeric or plastic outer hose, the use of a complex and vulnerable vacuum in the remaining annular space between the tubes for reasons of insulation can be avoided. This combination minimizes the heat influx and consequently insures greater thermal efficiency of the system while an overall flexibility and elasticity is ensured.

The insulating, low conductive fibrous spacer material in the gap in between the inner hose and the elastomeric or plastic outer hose may comprise a fleece material, filaments, webbing, mesh, plait, etc. The main aspect of this fibrous material is that it forms a resilient three-dimensional matrix with good insulating capacities as air is trapped in between the fibres. The preferred fibrous material is at least as flexible as a conventional synthetic sheath so that it can be wrapped around the inner tube for purposes of placement just as synthetic material has been used in the past.

The insulating fibrous spacer material can be combined with the use of a fabric that is woven, braided, interwoven, intersticed, knitted or the like and can be made of fibres or ceramic threads. It can be made in the form of strips, mats, sheets, tubular hoses, tubular knit fabrics etc. It is within the scope of the invention to use individual lengths of the fibrous materials which are fastened to the inner LNG conduit or the outer hose as by tying, bonding, gluing, etc. For example, the insulating spacer material can be made of a continuous narrow strip of multilayer material which is formed out of a web of fibres. The individual sheets or mats of multilayer fibrous spacer material can be secured together by stitching, tying or helically winding with a strand material or thread of low conductivity such as cotton or rayon to unify the strip and stabilize it against disruptive elongation. As the material is very flexible and stretchable, it is even possible that the layers of material do not need to be secured together.

The insulating sheet of fibrous spacer material that bridges the space between the outer and inner hoses can comprise interspersed multiple layers of fibrous and heat reflective material. In certain embodiments, the fibrous spacer material can be faced on one or both sides with one or more abrasive-resistant facings, such as a foil of metallized plastic sheet material. The fibrous spacer material can be combined with one or more radiation barrier sheets with a thickness of less than 0.2 mm. This heat radiation reflective material could be a metal or aluminium foil. Alternatively, the inner LNG hose can be wrapped in multiple layers of reflective metallized material. The fibrous insulating spacer material can be added onto these metallized material layers or can be wrapped around it. Several layers of insulating spacer laminate material are wrapped around the inner hose or tube.

A characteristic of a preferred fibrous spacer material is that it can normally be stretched and compressed at least 10% without any resulting permanent deformations. This is an important aspect as a flexible aerial, floating or submerged LNG transfer hose is placed in a very dynamic offshore environment and will be subject to repetitive compression, elongation, bending, torsion etc.

The insulation spacer material also needs to be able to accept the relative differences in elongation or retraction of the inner and outer hoses during cooling down or warming up procedures in the LNG transfer process.

Preferred insulating spacer material comprises a fleece made of natural material, plastic (PET) or other synthetic or ceramic material. With the term 'fleece' as used herein, a coherent body of matted fibres, filaments, threads or wires with interconnected interstices is intended. Fleece can for example be in the form of a velour fabric with Aramide fibres or can be made out of PET material. The different layers are preferable not bonded one to each other but wrapped. Due to the friction coefficient (which is between 0.7 and 0.83, depending on the type of fleece) the wrapped layers have a strong cohesion, even during repeatable bending and stretching of the wrapped layers.

Fleece is a very good insulating spacer material as it has a small thermal conductivity combined with high mechanical strength. The fleece is preferably composed of fibres having diameters less than about 10 micron.

The fleece can be a double velour fabric which has an improved dynamic and insulation performance, for example a fleece as disclosed in U.S. Pat. No. 6,779,368.

It is also possible to use a fleece material which has had a known specific treatment to avoid the building up of static electricity when the fleece material works against itself or against the inner and/or outer hose.

When placed in the gap of the coaxial hoses, the fleece material can be stretched at least 10% and is compressible in the length direction of the hose without any permanent deformations or elongations.

The fleece in accordance with the present invention is made to have a certain minimal strength in a radial direction so that when it is placed in the gap, it maintains the inner tube and the outer flexible hose in radially spaced relation while at the same time accommodating differential lengthwise thermal contraction of the inner tube and outer hose. The fleece has a point-wise contact with the inner tube, with the outer hose or with both. The fibres are orientated substantially in the length direction of the hoses, i.e. perpendicular to the direction of heat influx across the insulation space. Due to these capacities of the fleece material, the use of any additional spacers that could function as a temperature bridges between the inner tube and the outer hose, can be avoided over at least 0.40 m. If a spacer is need to be added, a spacer made of a compact and less flexible fibrous material with high insulation capacities like a felt material, can be added on top of the fleece material at regular intervals. No other spacer element than these fibrous materials extends radially from a contacting position on the inner hose to a contacting position on the outer hose.

Several layers of insulating spacer material may be wrapped around the inner hose or the braid covering the inner hose. Each spacer layer can be wrapped under e.g. a 45 degrees angle with the axis of the inner hose, so that the difference in orientation of the respective layers is 90 degrees. Depending on the characteristics of the spacer material (orientation of the fibres, production method, capacities, etc) different wrapping angles and different numbers of layers can be applied.

A co-axial inner and outer cryogenic transfer hose according to the invention, can in view of the open porous structure of the fibrous spacer material be formed by the steps of:
  providing a first hose
  providing a fibrous or porous or insulating material around the first hose,
  providing an air tight film around the fibrous or porous material and placing said film in an airtight configuration around the first hose
  removing air from the airtight enclosure for reduction of a diameter of the fibrous or porous material by compression,
  placing the first hose, the compressed fibrous material and the film material into the outer hose at reduced pressure, and
  increasing the air pressure of the fibrous or porous material to allow it to expand.

The tube can be assembled in such a way that once all segments are connected and the fibrous insulating material is filling the gap between the inner and outer hose, there is still the possibility to purge the gap passage with air or an inert gas to remove any gas that leaked from the inner hose. Alternatively the gap passage can be over-pressurized (15-25 bar) with air or an inert gas to avoid any leakage of gas from the inner hose which contains LNG at a pressure of 10 Bar.

In case the inner hose is a multi-layer composite inner hose, provided with a braid, the wrapped layers of fleece material enclose a large volume of trapped air and the inner hose with wrapped fleece layers has such a relatively large diameter that it can not be placed into the outer elastomeric hose. To add the inner tube into the outer hose, a thin plastic hose-shaped bag or tubular sheet is pulled over the inner tube with wrapped fleece layers, which thin plastic hose is closed. A vacuum is applied to this plastic hose so to remove the trapped air from the fleece material. As a result of this added vacuum the overall diameter will shrink such that the inner tube with wrapped fleece layers can now be inserted in a co-axial manner into the outer protective hose. Once the end flanges of the inner tube and the outer hose are aligned (and may coupled together), the vacuum can be removed and the fleece material sucks air into the gap and inflates itself, thereby fixing itself in a spacing manner between the inner tube and the outer hose.

Additional spacers for example made of fibrous felt material, can be added on top, within or under the wrapped fleece layers at regular distances. The additional spacers have an outer diameter that is smaller than the inner diameter of the outer hose so that the thin plastic hose-shaped bag can still be placed over it and a vacuum can be added so to reduce the overall diameter of the fleece material. Alternatively the thin plastic hose-shaped bag can first be placed over the wrapped fleece layers and after that the felt spacers can be added on regular intervals on top of the hose-shaped bag, locally reducing the diameter of the overall diameter. A vacuum is applied to this plastic hose so to remove the trapped air from the fleece material. As a result of this added vacuum the overall diameter will shrink such that the inner tube with wrapped fleece layers and additional spacers can now be inserted in a co-axial manner into the outer protective hose.

By tailoring the thickness of the fibrous spacing material that is applied on the inner tube, and a consequent increase in the vacuum applied to reduce the diameter of the combined inner hose and spacer, the degree of compression of the fibrous material in the annular gap and hence the stiffness of the spacer can be varied in order to obtain a flexible hose with specific bending characteristics.

Another advantage of the use of a fleece material as an insulating spacer for LNG transfer systems is that a Velcro® fastener material can be used to fasten the sheets of fleece material on the inner tube, the outer hose or on both. This ensures a fixed position of the fleece while accommodating differential lengthwise thermal contraction of the inner tube and outer hose and during repetitive bending and stretching of the both.

With a fibrous spacer material like a fleece and/or felt placed in the gap, it is still possible to move air or inert gas via the gap from one end to the other end of the interconnected hoses of the LNG transfer system. This enables a gas detection system at one of the ends of the assembled LNG system to quickly detect any leakage of LNG of gas into the gap. It is also possible to create an over-pressure in the gap which is higher that the fluid pressure in the inner hose, so that no gas can leak out of the inner hose into the gap space.

Alternatively, the gap can be provided with multiple interconnected temperature sensors placed at regular intervals within the gap and connected to a temperature sensor system which can indicate the area or place were LNG or cold gas leaks from the inner tube into the gap. As both the inner tube and outer hose are segmented, the segment that contains the leak can be changed-out and replaced by a new segment without replacing the complete flexible LNG transfer system, which would be the case with a continuous corrugated metal outer tube.

Since the combination of a fibrous stretchable spacer material in the gap between an inner LNG transfer tube and an outer hose, the outer hose being made of a composite, elastomeric or plastic material which has a low heat transfer conductivity, avoid air convection, minimizes the heat influx and consequently insures greater thermal efficiency of an overall flexible LNG transfer system, it avoids the need for a less than atmospheric pressure or vacuum in the gap for insulation purposes as is the case for the LNG transfer system disclosed in U.S. Pat. No. 6,186,181. In the known co-axial hose arrangement described in this document, a vacuum is required in order to reduce heat influx via the highly conductive corrugated outer tube.

The invention furthermore relates to a fibrous insulation material for use in a cryogenic transfer hose comprising an airtight film and a fibrous layer attached to said film. The sheet material may be wound around the inner hose; either in a tubular shape or in helically wound strips and then be evacuated to compress the fibrous material to result in an inner hose with reduced diameter which may be easily inserted into the outer hose. The film may be sealed to form a cylinder surrounding the fibrous material, prior to or after applying the fibrous material to the inner hose. In one embodiment, the cylinder formed of the film and fibrous material, is closed in an airtight manner at a bottom and comprises an attachment member, such as a screw thread or valve for attaching to an evacuation device and removal of air from the cylinder. In another embodiment, the fibrous material is comprised between the film and a second film, which films are sealed together in an airtight manner. A closable airflow opening may be provided in at least one of the films. By evacuating the space between the films, the fibrous layer is compressed such as to have a reduced diameter when placed around the inner hose. After insertion of the inner hose and compressed fibrous layer into the outer hose, the vacuum is removed and the fibrous layer expands to fill the annular gap between inner and outer hose.

In an embodiment the hose is made up of several segments each having interconnecting end flanges. The hose is constructed or repaired by providing a first and second hose segment each having an inner and outer hose, compressed fibrous material between the inner and outer hoses and a connecting flange at an end part, interconnecting the connecting flanges of the first and second segments and increasing the air pressure of the fibrous or porous material in the first and second segments after interconnection.

Some aspects of different embodiments according to the invention will by way of example be described with reference to the accompanying drawings.

Some aspects of different embodiments according to the invention will by way of example be described with reference to the accompanying drawings.

Figure 2:
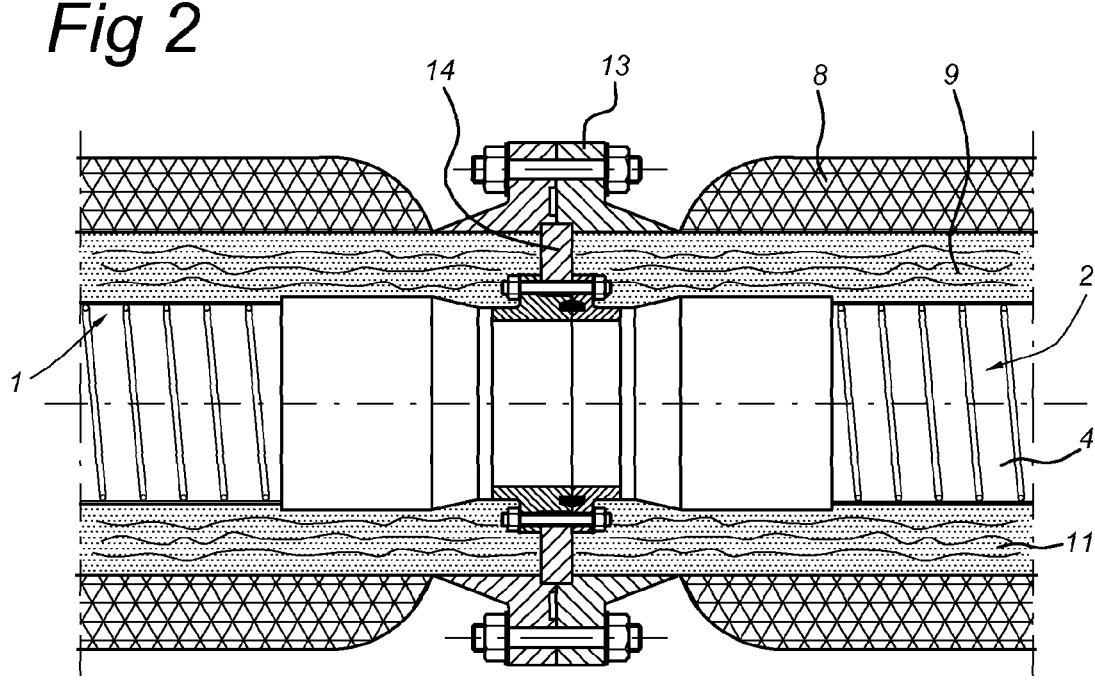
Figure 3:
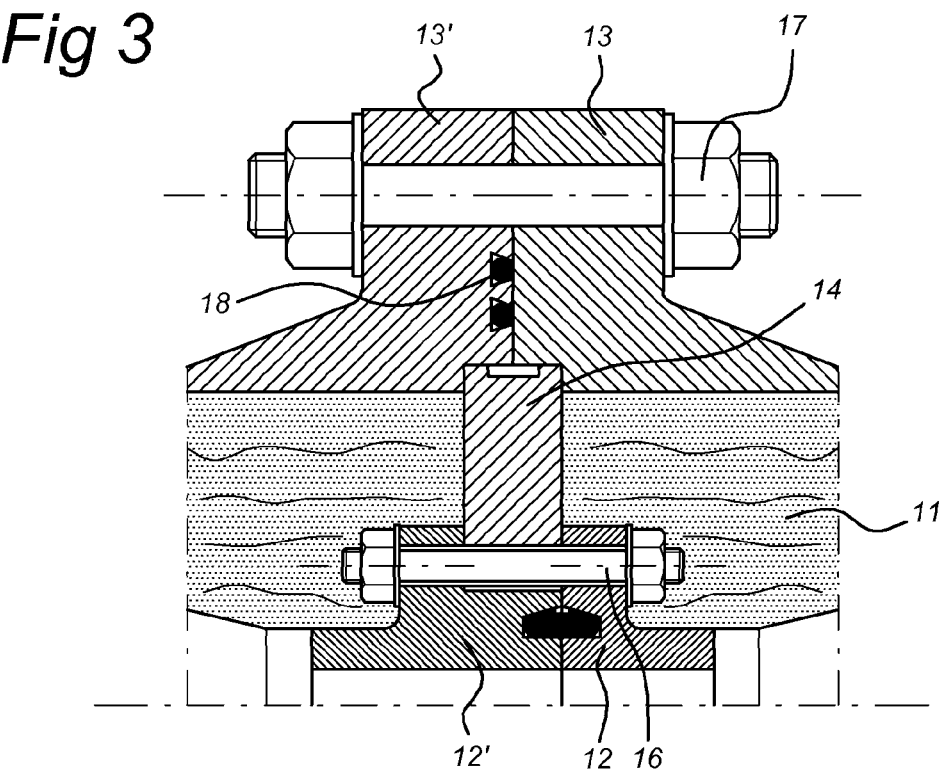
Figure 4A:
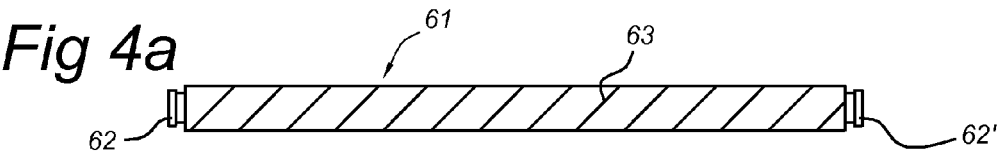
Figure 4B:
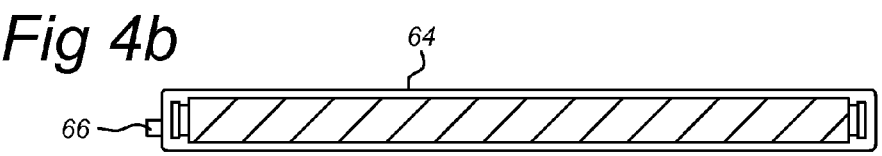
Figure 4C:
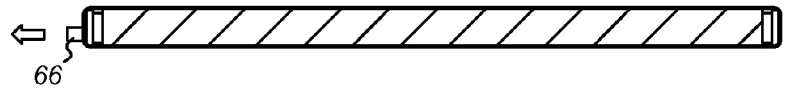
Figure 4D:
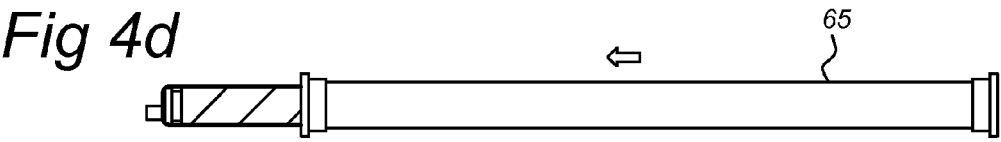
Figure 4E:
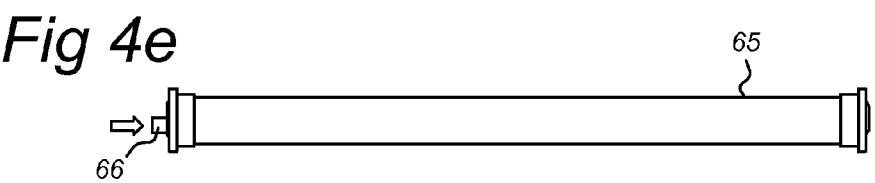
Figure 4F:
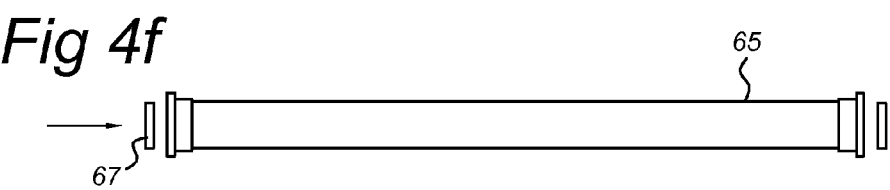
Figure 4G:
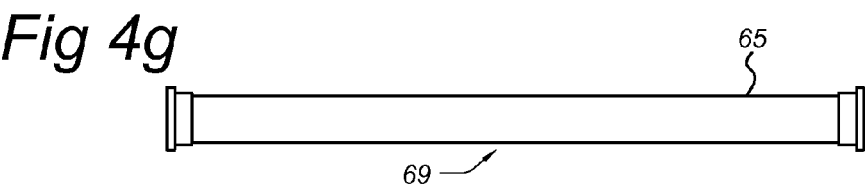
Figure 5A:
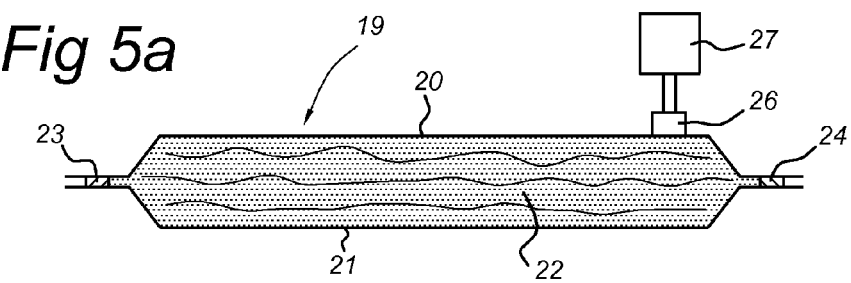
Figure 5B:
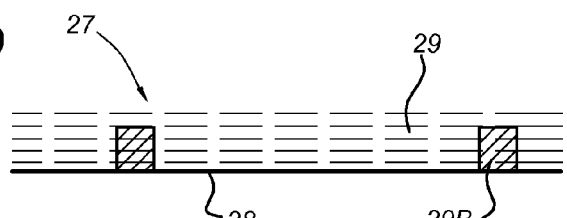
Figure 5C:
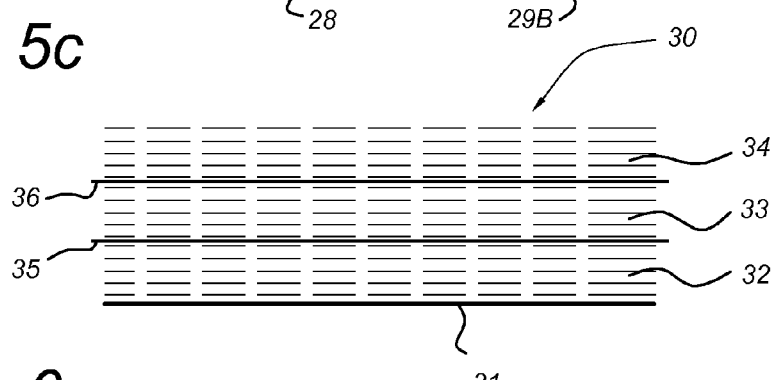
Figure 6A:
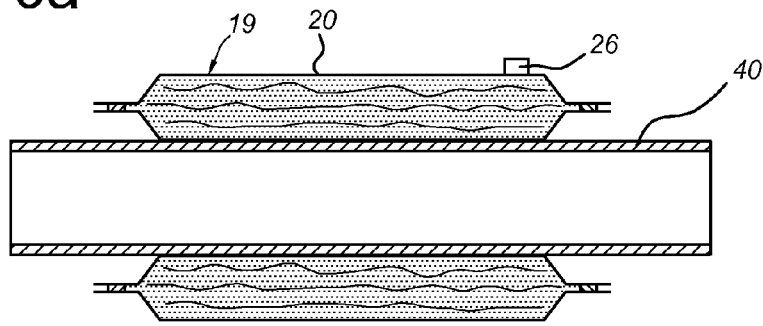
Figure 6B:
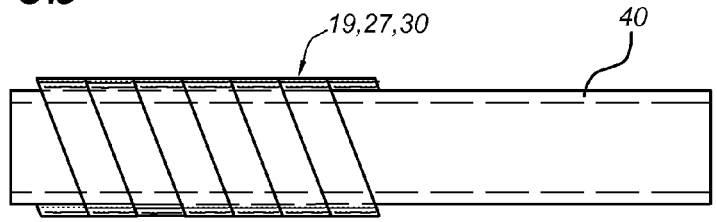
Figure 7:
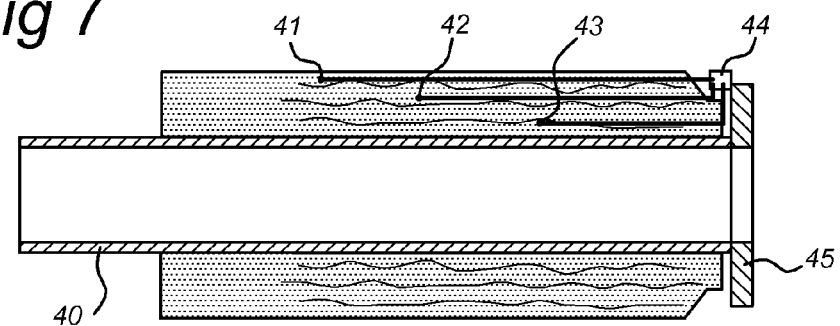
Figure 8:
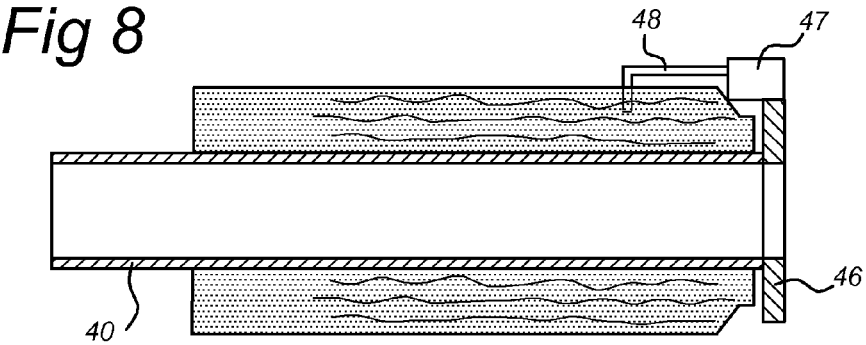
Figure 9:
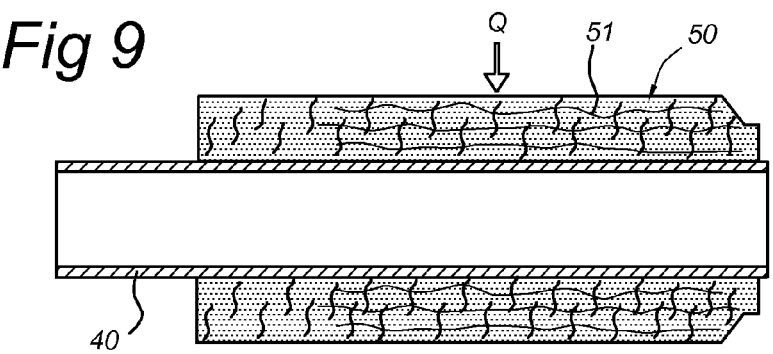
Figure 10:
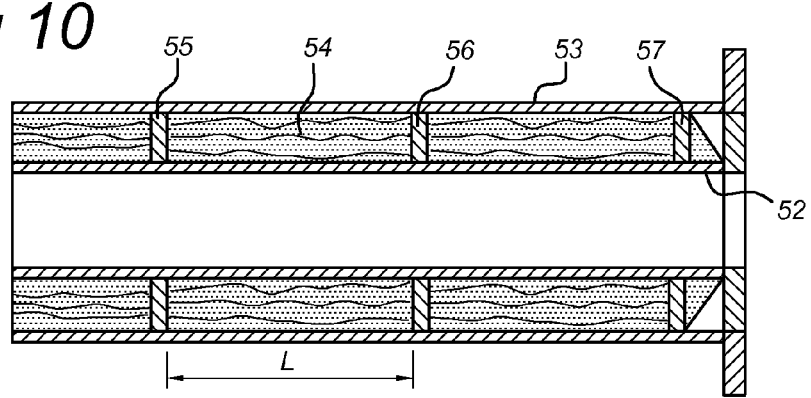
Figure 11:
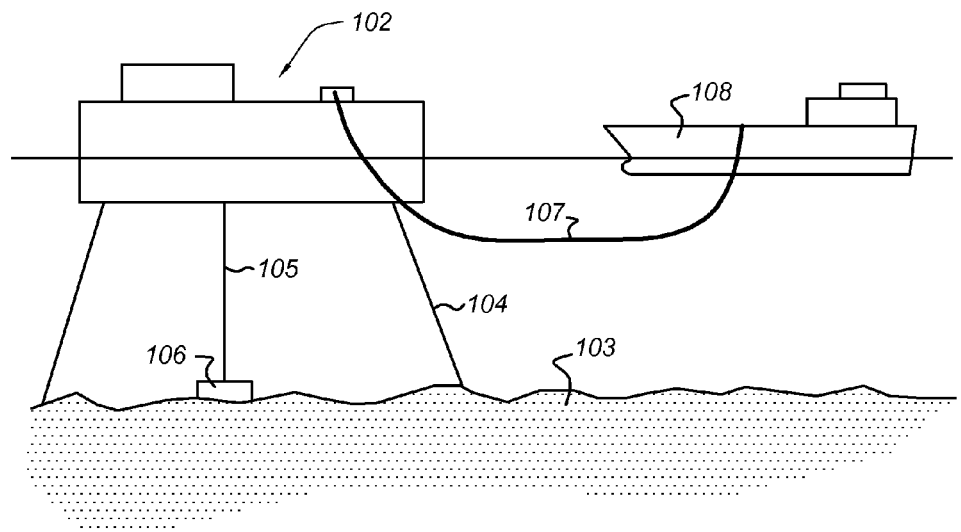
Figure 12A:
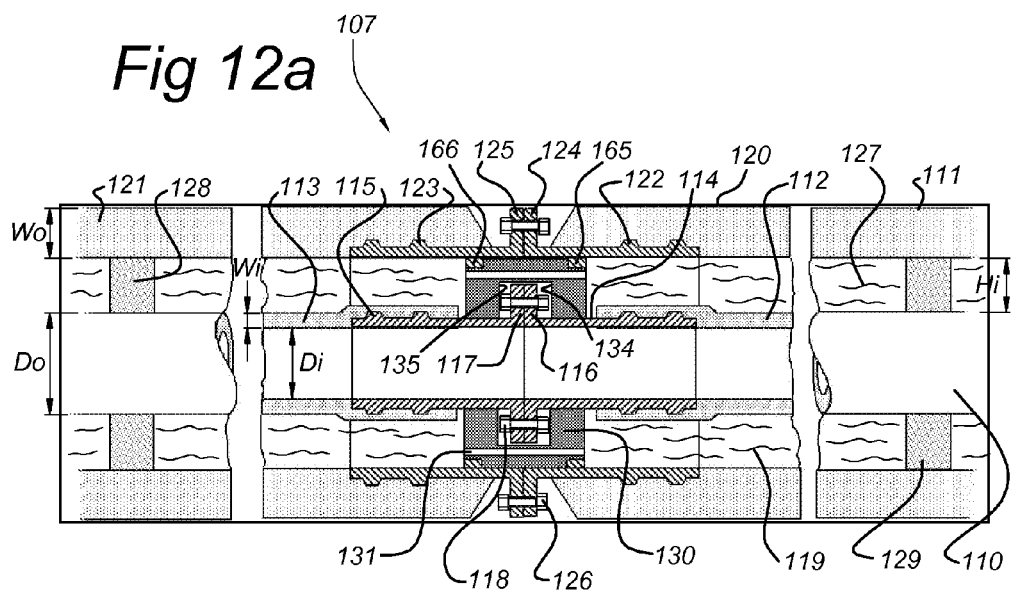
Figure 12B:
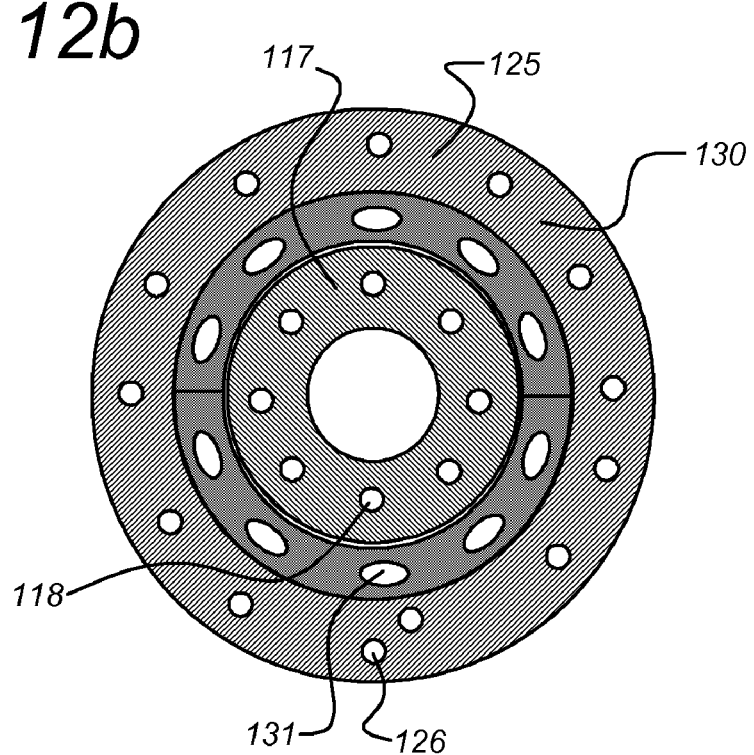
Figure 12C:
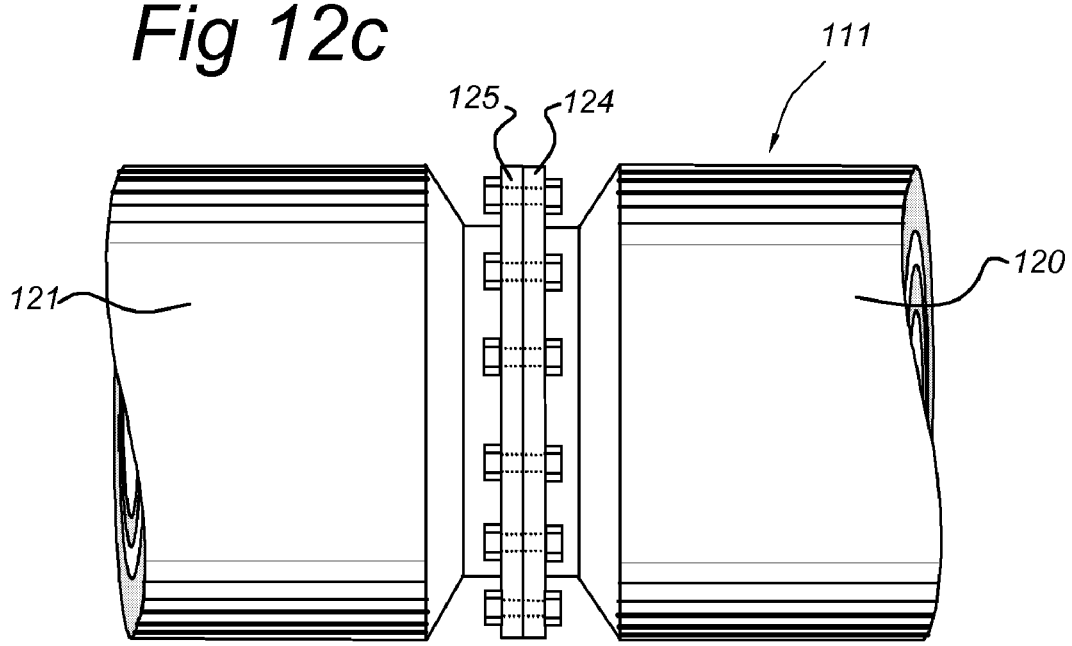
Figure 13:
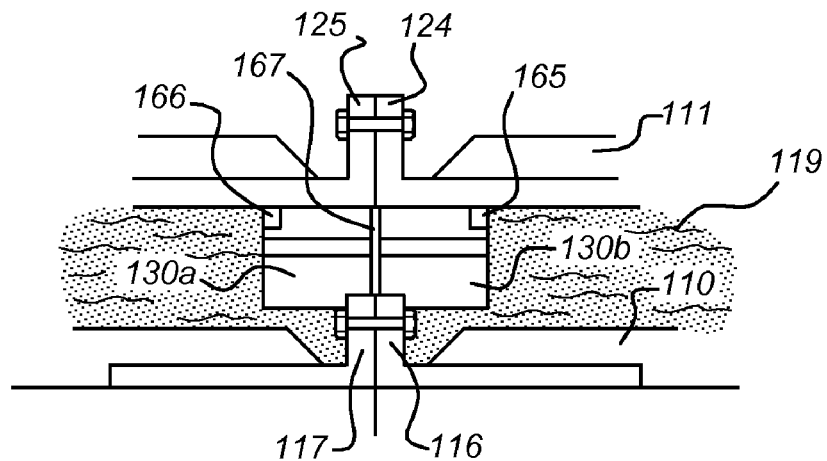
Figure 14:
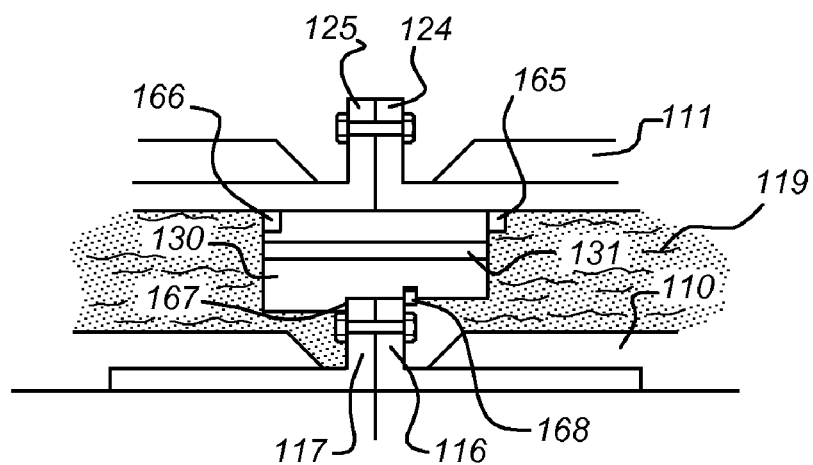
Figure 15:
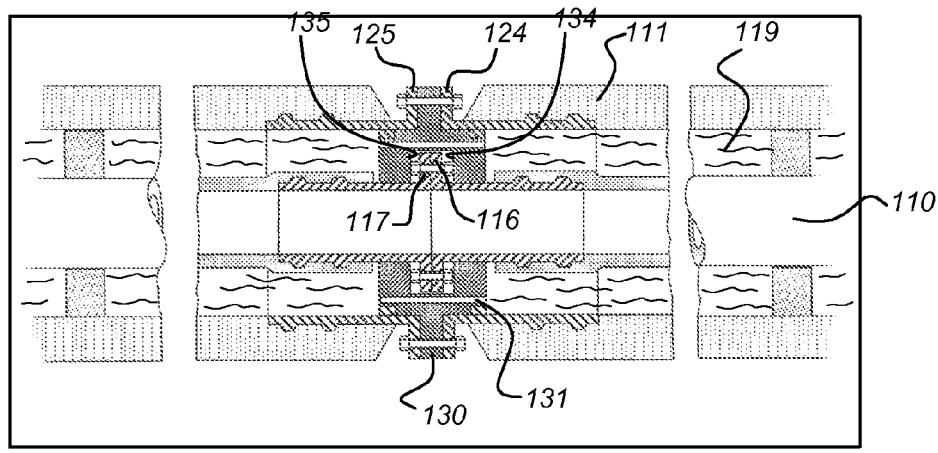
Figure 16A:
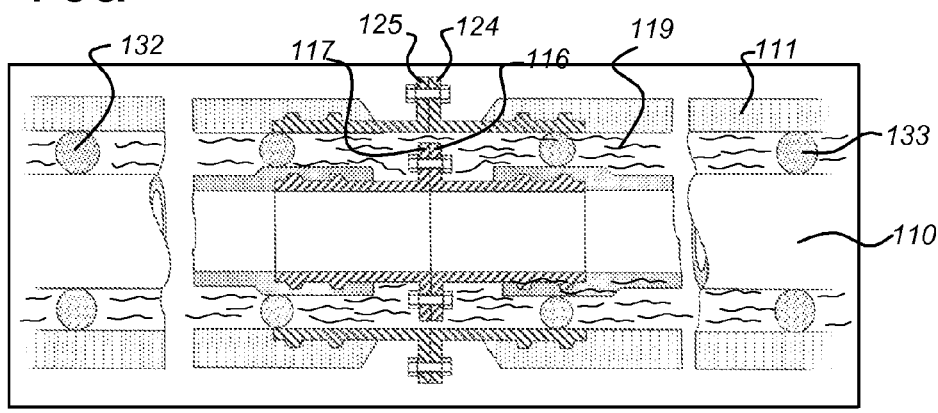
Figure 16B:
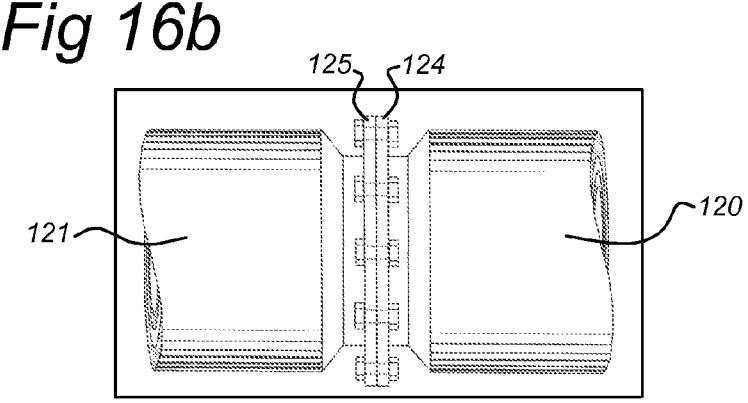
Figure 17A:
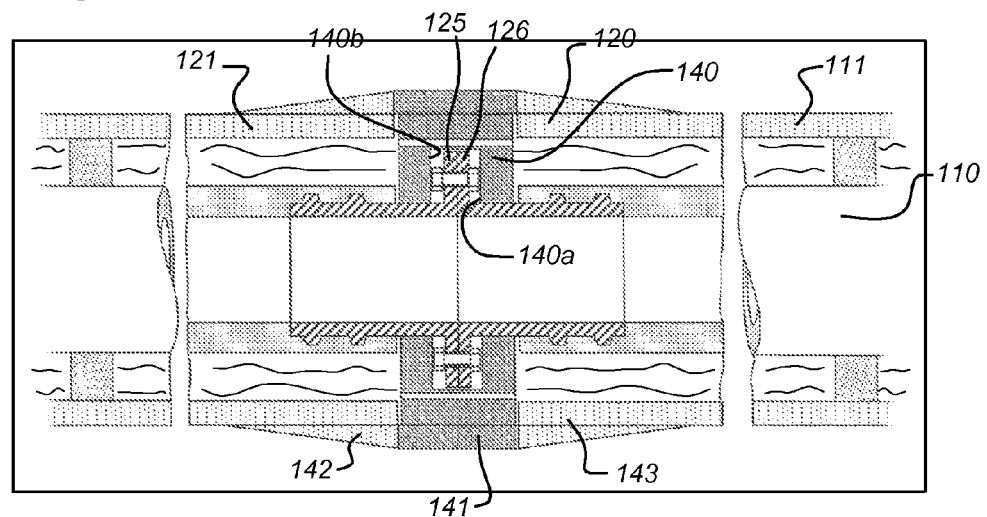
Figure 18A:
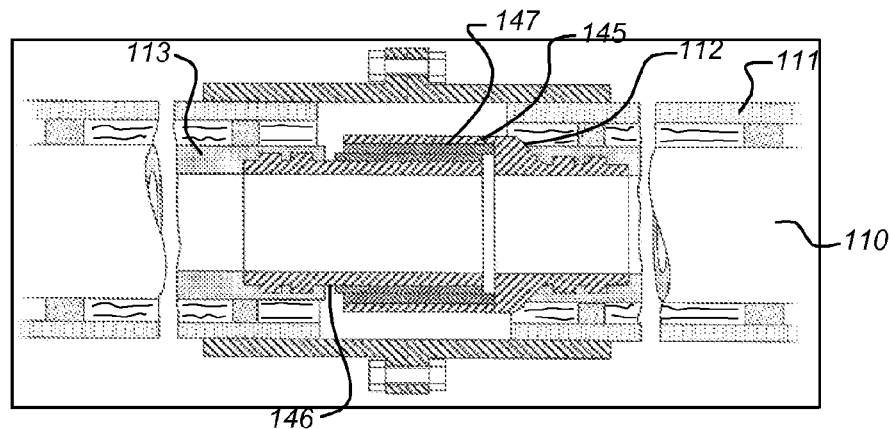
Figure 18B:
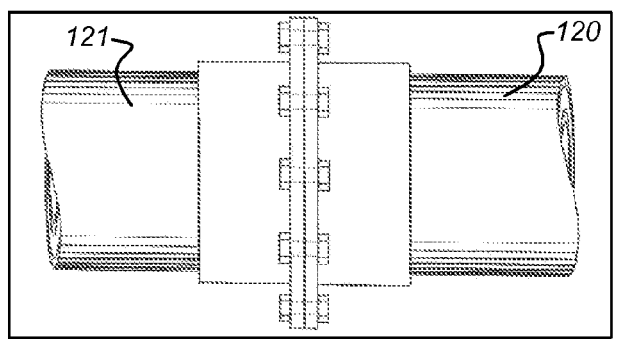
Figure 19:
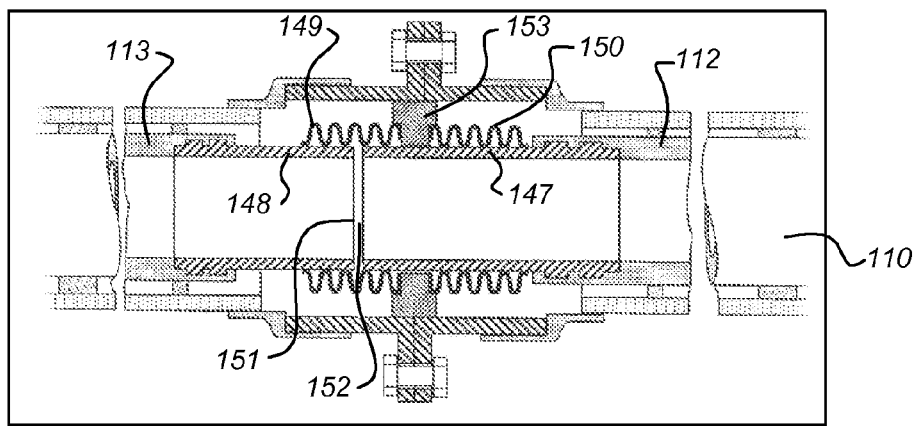
Figure 20:
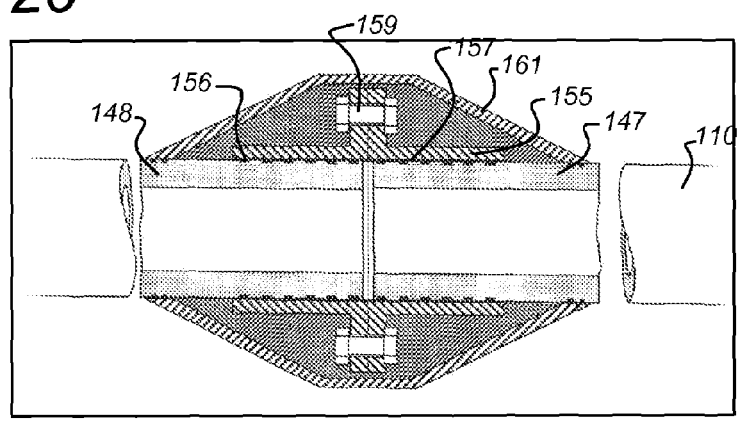
Figure 21:
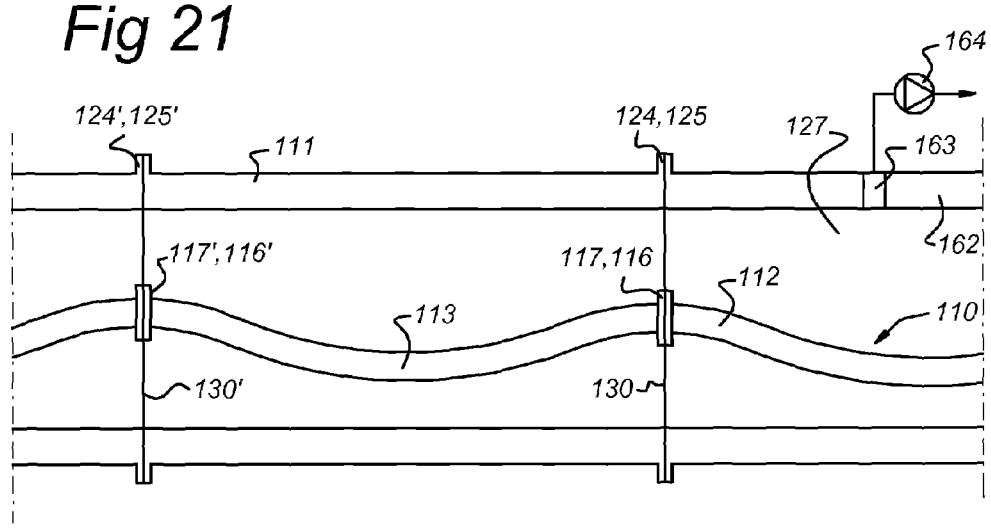
Figure 22:
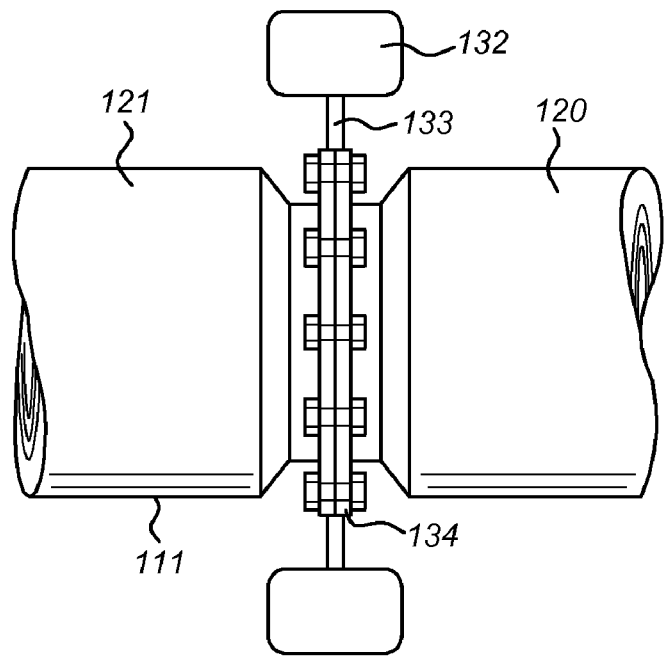
Figure 23:
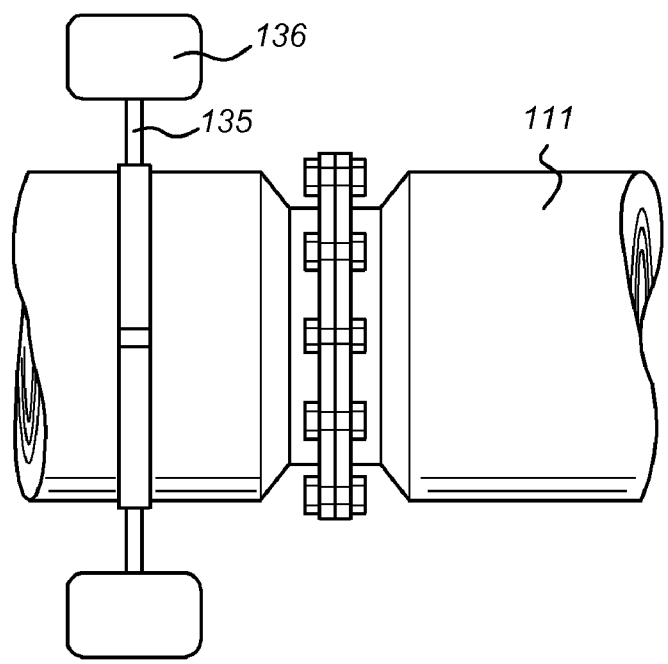

In the drawings:

FIG. 1 shows a perspective partially cut-away view of the cryogenic transfer hose according to the invention, FIG. 2 shows a longitudinal cross-sectional view of a cryogenic transfer hose of the invention, FIG. 3 shows the coupling of the interconnected hose segments on an enlarged scale, FIGS. 4a-4g show the consecutive steps of assembling a hose segment for use in a cryogenic transfer hose according to the invention, FIGS. 5a-5c show different embodiments of a composite insulating material for use as a spacer according to the present invention, FIGS. 6a and 6b show the composite insulating material applied to an inner cryogenic transfer hose in a sleeve-type manner and in the form of coiled helical windings respectively, FIG. 7 shows an inner hose and insulating spacer material having a number of temperature sensors distributed along its length, FIG. 8 shows an inner hose and insulating spacer material having a gas detection system at an end flange part, FIG. 9 shows a fibrous insulating spacer material with the majority of the fibres oriented in a length direction of the hose, FIG. 10 shows a cryogenic transfer hose with additional spacer elements, FIG. 11 shows a schematic view of an LNG transfer system using a cryogenic transfer hose according to the present invention, FIGS. 12a, 12b and 12c show a longitudinal cross-sectional view, a transverse cross-sectional view along the line AA and a plan view of a hose-in-hose cryogenic transfer assembly in accordance with the present invention, respectively, FIGS. 13, 14 and 15 show a longitudinal cross-sectional view of embodiments wherein the connecting flanges of the inner hose are coupled to the connecting flanges of the outer hose, FIGS. 16a and 16b show a longitudinal cross-sectional view and a plan view respectively of an inner hose which is movable in the length direction relative to the outer hose, FIGS. 17a and 7b show a longitudinal cross-sectional view and a plan view respectively of an embodiment wherein a spacer is constructed around the flanges of the inner hose, FIGS. 18a and 18b show a longitudinal cross-sectional view and a plan respectively of an embodiment wherein the inner hose comprises a slidable connecting member, FIG. 19 shows a longitudinal cross sectional view of a sliding connecting member of the inner hose comprising a sealing bellow, FIG. 20 shows a longitudinal cross sectional view of a clamping connecting member of the inner hose comprising a number of face seals, and FIG. 21 shows a schematic longitudinal cross sectional view of an inner hose extending along curved trajectory within the outer hose, so as to be elongatable, and FIGS. 22 and 23 show different configurations of buoyancy modules attached to the outer hose of the present invention at a distance there from in order to allow uniform contact of the outer hose with the environment and hence uniform heating up of the cool outer hose by the environment for maintaining sufficient flexibility.

FIG. 1 shows two interconnected cryogenic transfer hose segments 1, 2 of a cryogenic transfer hose 3. Each hose segment comprises an inner corrugated or helical wire-reinforced metal hose 4, having an inner an outer helical wire 5, 6 which support respective inner and outer sides of a fluid impervious layer 7. The inner hose can be provided with a tubular braid (not shown) to fight and restrict elongation of the inner hose that results from the pressure of the fluid transferred. Around the inner hose 4, an elastomeric or plastic outer hose 8 is placed at a distance from the inner hose 4. In the annular gap 9 between the outer hose 8 and inner hose 4, a fibrous insulating spacer material layer 11 is placed, which lies in contacting relationship with the outer perimeter of inner hose 4 and the inner perimeter of the outer hose 8. The fibrous layer 11 resists compression upon bending of the outer hose 8 or stretching due to thermally and pressure induced expansion and contraction of the hoses 4, 8 and forms a spacer element preventing the inner hose 4 from contacting the outer hose 8.

The segments of the inner hose 4 are interconnected via an internal coupling flange 12 whereas the outer hose segments are connected via an external coupling flange 13. At the position of the coupling flanges 12, 13, a spacer ring 14 bridges the annular space 9 and interconnects the flanges 12, 13 in order to prevent the flanges 12, 13 from becoming separated in an axial direction. Such a separation of the flanges 12, 13 in an axial direction is undesired as upon exchange or repair of a hose segment 1,2, the internal coupling flange 12 must at all times be accessible after detaching the external coupling flange 13.

As appears clearly form FIG. 2, the fibrous spacer material 11 extends in the annular gap 9 up to the position of the spacer ring 14. At this position, the fibrous material 11 does not act as a spacer member for maintaining a predetermined distance between the outer hose 8 and inner hose 4, but is only functional as an insulating material. As can be seen from FIG. 3, the internal coupling flanges 12, 12' and the external coupling flanges 13, 13' of the hose segments 1, 2 are interconnected via bolts 16, 17. Fluid tight seals 18 are situated at the interface of the external flanges 13, 13'.

FIGS. 4a-4g show different steps in the manufacturing process of a co-axial cryogenic transfer hose assembly using a fibrous insulating material in the annular gap between the inner and outer hose. FIG. 4a shows an inner hose 61 with wrapped around it the fibrous fleece material 63. Additional spacers made for example of compact fibrous felt material and with a diameter smaller than the inner diameter of the outer hose, can be placed at regular intervals on top, within or under the fibrous fleece material. The coupling flanges 62, 62' project in an axial direction from the fleece material such as to be accessible for coupling. An airtight sleeve 64 having evacuation connectors 66 comprising a valve, is placed around the inner hose 61 (FIG. 4b) after which the sleeve is evacuated (FIG. 4c) by attaching an air pump to the evacuation connector 66 and creating an under pressure of less than 0.9 Bar. The reduced-diameter hose 61 is then introduced into the outer elastomeric and/or plastic hose 65 and air is reintroduced into the airtight sleeve 64 via the valve in the evacuation connector 66 (FIGS. 4d and 4e). Finally the end flanges 67, 67' are placed around the inner hose and interconnected with the outer hose 65 to complete the co-axial hose segment 69 shown in FIG. 4g.

FIG. 5a shows a composite fibrous insulating material 19 according to the invention that can be used as a spacer member for positioning the inner and outer hoses 4, 8 of a co-axial cryogenic duct configuration such as shown in FIGS. 1-4. The composite material 19 comprises gas tight film layers 20, 21 surrounding a core matrix 22 of fibrous material encased between the layers 20, 21. Along their perimeter the layers 20, 21 are mutually sealed in liquid tight sealing areas 23, 24. An evacuation connector 26 can be provided in the film layer 20 having a closing valve member, for connecting to an evacuation device 27, such as a vacuum pump. The composite material 19 can be in tubular form or can be in strips or sheets which can be wrapped around the inner hose. After application to the inner hose, air is removed from between the sheets 20, 21 such that the composite material is compacted and the inner hose with composite material supported on this hose can be introduced into the outer hose. After the inner hose carrying on its perimeter the compacted composite fibrous insulating material 19, is brought in the desired axial position, air can be admitted to the core 22 of fibrous material via the evacuation connector 26 such that the fibres can expand in the annular gap 9 between the hoses. When uses as a spacer member, the fibrous core 22 of the composite material 19 is allowed to expand such that it completely fills and bridges the annular gap 9.

FIG. 5b shows an alternative composite fibrous insulating material 27 having a single impervious sheet material layer 28 with bonded thereto via gluing, thermo bonding, hot calendaring, hot embossing, and the like, the fibrous layer 29. Additional strips 29b of compact fibrous material like felt material, having a smaller height, can be added to function as stiff additional spacers. The sheet material 28 can be in the form of a plastic layer, a heat reflective layer such as aluminium or composites of a plastic (PE, PP) and a metal (aluminium). The composite material 27 can be used in tubular form around the inner hose or can be used in strips or mats around the inner hose, with the impervious sheet 28 preferably located on the outside.

FIG. 5c shows a composite fibrous insulating material 30, with a fluid impervious backing layer 31, and laminated thereto a number of fibrous layers 32, 33, 34. Interspersed with the fibrous layer 32-34 are radiation reflection layers 35, 36, which may be formed of a metal sheet such as aluminium or a laminate of a plastic material and a metal such as aluminium-PE laminates. The use of reflection layers 35, 36 increases the heat insulating properties of the composite material 30.

FIG. 6a shows the composite material 19 of FIG. 5a being placed around an inner hose 40 when in a co-axial tubular manner. Alternatively, the composite material 27 of FIG. 5b or the composite material 30 of FIG. 5c can be placed in a similar manner around the inner hose 40 with the backing layers 28 or 31 at the position of the outer layer 20 in FIG. 5a.

FIG. 6b shows the composite material 19, 27 or 30 wrapped around inner hose 40 in helical loops. In case a composite material is used of the type shown in FIG. 5b or FIG. 5c, the backing sheets 28, 31 form the outer layer, wherein the backing sheets of neighbouring strips are sealed in a gas-tight manner.

It should be noted that a composite material 19, 27, 30 need not completely fill the annular gap 9 between the coaxial inner hose 4, 40 and outer hose 8, but can also be used as an insulating material only in the annular gap, by being easily introduced into the gap by means of the evacuation process that is described here below in relation to FIGS. 4a-4g.

FIG. 7 shows an embodiment in which multiple temperature sensors 41,42,43 are distributed along the length of the inner hose 40. If liquefied gas escapes from a leak in the inner hose 40, the temperature sensors will measure a drop in temperature. The signals from the sensors 41, 42 and 43 can be supplied to a transmission unit 44 that is situated in the region of the end flange 45 of the inner hose 40. From the transmission unit 44, the temperature data can be transmitted to a leak detection unit, situated on a floating structure which is connected to the pipe 40.

In the embodiment shown in FIG. 8, a gas detection unit 47 is incorporated in the area of an end flange 46, of the transfer hose. The gas detection unit 47 comprises a pump and an inlet tube 48 which is connected to the space between the outer hose (not shown in the drawing) and the inner hose 40. Via the open fibrous matrix of the spacer material, the gas detection unit 48 is in fluid connection with the annular space between the inner and outer hoses along the length of the interconnected hose segments.

FIG. 9 shows a fibrous material 50 placed on the inner hose 40, the fibres forming a coherent three-dimensional matrix, the orientation of a majority of the fibres 51 being substantially in the length direction of the hose 40. In this way, the heat influx Q from the outer hose can be reduced by the fibres 50 and improved temperature insulation is achieved.

FIG. 10 shows a configuration of a cryogenic inner hose 52 and coaxially around it a flexible outer hose 53. Fibrous material 54 is placed in the gap between the inner and outer hoses. Additional spacer members 55, 56, 57 preferable made of a compact and slightly compressible fibrous material like felt material, bridge the annular gap and abut against the inner and outer hoses. Depending of the hose diameter, the distance L between the additional spacer elements 55, 56, 57 can vary from 40-100 cm and in that case the fibrous material 54 only has mainly a heat insulating function. Both the fibrous material and additional spacers can be introduced together into the gap by means of the evacuation process that is described here above in relation to FIGS. 4a-4g. It is possible that the additional spacers 55-57 completely bridge the gap space between the inner and outer hose as shown in FIG. 10, or that they are placed on top, within or under the fibrous material 54 (see FIG. 5b). The additional spacers can also be added in a helical way onto the inner hose or on top of the braid the inner hose (not shown).

In certain embodiments, the additional spacer elements 55-57 can be omitted altogether, the spacing functionality being completely provided by the fibrous spacer material 54 which can for example be in the form a of compact felt or fleece material or combinations of different fibrous materials.

In FIG. 11 an offshore production unit, comprising for instance a floating gas liquefaction and storage plant like an LNG FPSO, (floating production, storage and offloading) 102 is shown, which is anchored to the sea bed 103 via anchor lines 104. Via a product riser 105, hydrocarbons, such a natural gas, are transported from a sub sea well 106 to be processed in the FPSO 102. The FPSO 102 comprises a liquefaction plant, which cools and liquefies the natural gas to LNG at a temperature of −161° C. The LNG is transferred through a cryogenic transfer hose 107, which is submerged in this embodiment, but which also be a complete or partly aerial hose or which may float on the water surface, to a midship or bow manifold of an LNG carrier where it is offloaded. The cryogenic transfer hose 107 is flexible, in the sense that it can bend to a bend radius of for instance 10 m or more, preferably about 3 m or more. When not in use, the hose 107 may be wound on a horizontal or vertical reel, or be stored on deck of the FPSO 102. The hose can also be used for a configuration (not showns) in which the LNG carriers is offloading LNG to a LNG offloading buoy or a Floating Storage and Regasification Unit (FSRU) where the LNG is regassed and sent to shore via a submerged pipeline The hose 107 is made up from interconnected segments and comprises an inner reinforced hose conveying the LNG and an outer hose of reinforced elastomeric material protecting the outer hose from sea water ingress and providing mechanical strength and protection to the combined hoses. It also provides a safety barrier in case of inner hose failure and during testing and transport of the segments.

A submersible hose for transfer of crude oil is known from U.S. Pat. No. 3,809,128. In this document the volume of air within the space between the inner and outer hose is selectively controlled for adjusting the buoyancy of the hose. In order to maintain sufficient air space between the inner and outer hose and to prevent the outer hose from collapsing onto the inner hose due to water pressure, a helical spacer member is wound around the outer surface of the inner hose. The hose segments are interconnected via end flanges on the inner hose which project in a length direction beyond the end faces of the outer hose. As the inner hose is not surrounded by the outer hose at the connection flanges, it is exposed to the environment, and hence the known inner hose is not suitable for transporting a cryogenic fluid, such as LNG which may have a temperature of −161° C. or liquid Nitrogen which may have a temperature of −194° C.

In the cryogenic hose 107 according to the invention, the inner hose may have an internal diameter of at least 20 cm. The outer hose surrounding the inner hose comprising a watertight reinforced elastomeric material with a wall thickness of at least 3 cm, a bend radius of at least 3 m, and an internal diameter of at least 25 cm. The coaxial hose 107 according to the invention may be composed of an inner hose that is particularly suitable for transfer of cryogenic fluids, and is mechanically relatively weak, but is protected by the outer hose, which may be a hose known in itself for transfer of crude oil. The hose-in-hose configuration provides improved safety for the aerial, floating or submerged cryogenic transfer system as the outer hose protects the inner hose against collisions with other hoses, cranes, LNG carriers or other vessels, such as tugs or work boats, and prevents water ingress. The outer hose is relatively stiff compared to the inner hose but still flexible enough to be stored on a vertical or horizontal hose reel on a buoy, tower or on a vessel, or to be stored on board of a vessel in a gutter when not in use.

A segmented execution allows easy assembly of the hose to its desired length. The segments furthermore allow an easy off-shore change-out of a part of the LNG transfer system for inspection, maintenance or repair.

From U.S. Pat. No. 4,417,603 a cryogenic transfer hose is known for connecting an offshore platform to a tanker ship, comprising an inner helical metal spring, an outer helical spring offset by half a pitch and a layer of polymer material between the springs. A heat insulating layer surrounds the inner metal hose. The known cryogenic hose is made up of a single part and needs, in case of failure, be completely replaced. Furthermore, the cryogenic metal hose seems to be relatively vulnerable and is not effectively protected by the outer insulation which is directly attached to the metal inner hose.

With "cryogenic" as is used herein liquefied gases are intended which temperatures below −60° C., such as LNG which has a temperature of −162° C.

With "flexible reinforced wall" as is used herein, a composite or metal hose wall is included which has flexibility imparted thereto by for instance a bellow-like construction or which has a helical spring-like configuration or similar wall constructions which provide increased flexibility to the hose compared to a flat wall of sheet material.

With "marine" environment as is used herein, a position in use of the hose above the water surface, floating on the water surface, submerged below the water surface or any combination thereof are intended.

In one embodiment, the inner hose is elongatable and/or contractible in the length direction relative to the outer hose by at least 0.5% of the total hose length due to temperature differences, the inner hose not being connected to the outer hose at or near the inner coupling members. The moveable inner hose prevents stresses from building up when LNG is transferred. When no LNG is transferred, the coupling members can be independently aligned for the inner and outer hose in the axial direction, which facilitates assembly and/or exchange of the hose segments under normal environmental conditions.

In order to allow for thermally induced expansion and contraction of the reinforced inner hose, the inner connector members comprise a sleeve on one inner hose segment and a tubular end part on the other inner hose segment, slidably received within or around the sleeve. The sliding interconnection of the inner hose segments allows expansion and contraction of those hose segments in the length direction, while also being able to be displaced relative to the outer hose.

A composite or metal bellow may be sealingly connected to both inner hose segments, the bellow in a sealing manner engaging with an outer circumferential surface of the inner hose on both sides of an end part of the sleeve. In this way an effective seal is provided around the sliding interconnection of the inner hose segments.

Alternatively, the inner hose may be situated along a curved path within the outer hose, so as to be able to expand in the length direction relative to the outer hose by for instance 0.5-3% of the total length of the outer hose.

In a further embodiment, the connecting members of the inner hose are attached via an attachment member to the connecting members of the outer hose, for properly axially aligning the inner hose and maintaining it in a defined axial position relative to the outer hose. In order to allow circulation of an insulating medium in the space between the inner and outer hose, such as anti-freeze fluids, inert gases, air or for creating an insulating vacuum, in order to maintain the outer hose at a safe temperature, which is preferably not lower than −60° C., axial passages are provided in the attachment members that bridge the space between the inner and outer hose.

In order to withstand external pressures at a water depth of up to two hundred meters the outer hose may be provided with reinforcement rings.

In FIG. 12, segments of the inner hose 110 and outer hose 111 are shown in greater detail. The inner hose 110 comprises segments 112 and 113 which are interconnected via a connecting part 114, 115 comprising flanges 116, 117 connected via bolts 118. The outer hose 111 comprises segments 120, 121 that are interconnected via connecting parts 122, 123, which comprise flanges 124, 125 connected by bolts 126. The segments of the inner hose and outer hose may for instance have a length of 10 m but need not be of the same length. The segments of the inner hose may for instance have a length of 20 m while the outer hose segments have a length of 10 m, or vice versa.

The space 127 between the outer hose from 25 cm to 100 cm whereas the wall thickness $w_o$ of the outer hose 111 can be between 3 cm and 10 cm. The inner diameter $D_i$ of the inner hose 10 is between 20 cm and 70 cm, while the width $h_i$ of the 111 and the inner hose 110 is bridged by spacer elements 128, 129 which are supported on the outer surface of the inner hose 110. A spacer element 130 is arranged around the flanges 116, 117 of the inner connecting member, and fixes the position of the inner flanges 116, 117 with respect to the outer flanges 124, 125, while allowing a small motion of the inner hose 110 in the length direction. A passage 131 is provided in the spacer element 130 for allowing circulation of gases such as inert gas or air, in the length direction of the hoses 110, 111.

The inner diameter $D_o$ of the outer hose may range annular space 127 is between 2 cm and 16 cm. The wall thickness $w_i$ of the inner hose may be between 2 cm and 15 cm.

The inner hose 110 may be a flexible cryogenic corrugated metal hose such as described in Konrad Friedrichs, Fritz Papmahl and Herbert Backhaus, Offshore Technology Conference 3844 of May 5-8, 1980, or a coiled chrome nickel steel hose as described in U.S. Pat. No. 4,417,603 and in WO 01/96772.

The outer hose 111 may be a hose used for transfer of crude oil such as manufactured by Trelleborg AB, Trelleborg, Sweden under the tradename Trelline, Dunlop Oil and Marine, North East Lincolnshire, United Kingdom under the tradename Dunlop, and as well manufactured by Coflexip SA, Paris, France. The outer hose 111 is due to its construction and the use of reinforced elastomeric material, much stiffer than the inner cryogenic hose 110. The outer hose protects the inner hose from environmental forces and absorbs over 50%, preferably over 95% of the axial forces acting on the assembly of inner hose 110 and outer hose 11 during loading or offloading.

The space 127 serves to insulate the elastomeric outer hose 111 from the cold inner hose 110 and comprises fibrous insulating material 119. Air or inert gas may be circulated in the space 127 in order to ensure that the outer hose 11 is maintained at a safe relatively high temperature and the space 27 can be used for leak detection purposes. The air might be pressurised to just above the pressure of the transferred LNG to avoid leakage of LNG into the space 127 in case the inner hose is damaged.

The spacer elements 128, 129 which assist in keeping the inner and the outer hoses 110, 111 more or less in a co-axial arrangement, are made of an insulating material, such as a compact fibrous, rigid but slightly compressible felt material or a plastic or ceramic material, but may be replaced by a foam or a gel, or one or two tightly wound helical plastic pipes which may be compressible to allow relative movement or displacement of the inner hose with regard to the outer hose, due to differences in temperature induced contraction upon LNG transfer. Such a construction is described in detail in U.S. Pat. No. 3,809,128.

As shown in FIG. 12b, the spacer element 130 is formed of two half cylinders which can be placed around the outer diameter of the inner hose 110.

FIG. 12c shows the recessed position of the coupling flanges 124, 125 interconnecting the segments 120, 121 of the outer hose 111.

In the embodiment of FIGS. 13, 14 and 15, the spacer element 130 is made of an insulation material and is rigidly connected to the flanges 124, 125 of the outer hose 111, such that the axial and radial positions of the inner hose 110, especially at the positions of the flanges, is determined accurately in relation to the outer hose. The advantage is that if the flanges of the outer hose segments need to be opened for repair or maintenance, the flanges of the inner hose are also directly accessible as they cannot shift or be displaced within the outer hose during use in a dynamic marine environment.

In the embodiment shown in FIGS. 16a and 16b, the inner hose 110 is not fixed to the outer hose 111 at the position of the outer flanges 124, 125, and inner flanges 116 and 117. The spacer elements 132, 133 have a rounded shaped that is adapted to allow axial movement of the inner and outer hoses 110,111 to avoid stress caused by thermally induced contraction and expansion, which movement is accommodated by the fibrous insulating material 119 in the annulare space 127.

Figure 17B:
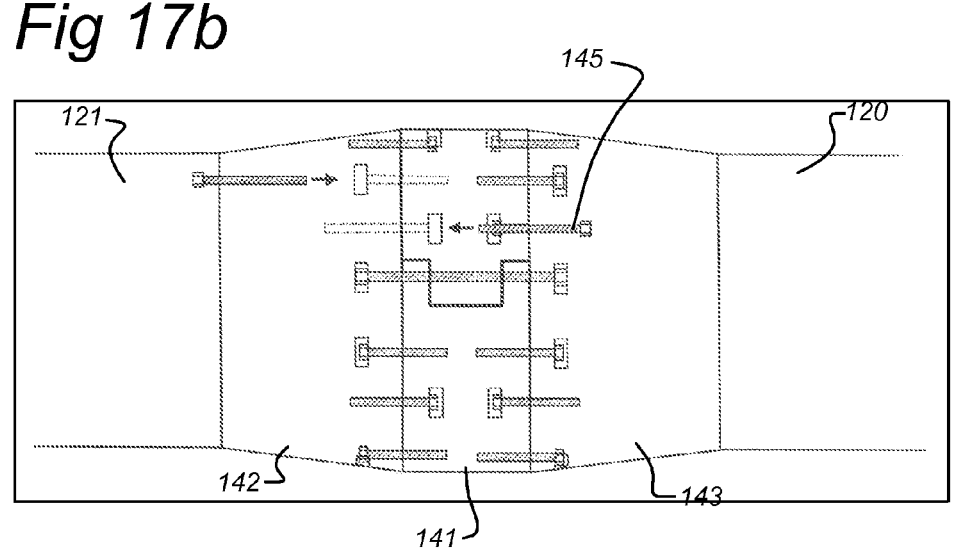

In the embodiment of FIGS. 17a and 17b, the spacer element 140 functions to radially position the inner hose 110 within the outer hose 111, but also to axially position the outer hose segments 120, 121. A coupling ring 141 is inserted between two bevels 142, 143 of the outer hose 111 and is connected to the bevels via axial bolts 145, as is shown in FIG. 17b.

In the embodiments of FIGS. 18a and 18b, the segment 112 of the inner hose 110 comprises a sleeve 144 in which the end part of segment 113 is slidably received. Seals are provided between the two sliding surfaces to ensure a leakage free fitting. The inside of the sleeve 144 and the outside of the end part of segment 113 are coated with a slidable material, such as polypropylene or Teflon.

In the embodiment of FIG. 19, the end parts 147, 148 of the segments 112, 113 of the inner hose 110 are provided with a sealing bellow 149, 150 which is placed around the end parts 147, 148, and extends past the end openings 151, 152 of the segments to sealingly engage a still sealing ring 153.

In the embodiment of FIG. 20, the end parts 147, 148 of the segments 112, 113 of the inner hose 110 are placed in a clamping sleeve 155 which sealingly engages, via a number of sealing rings 156, 157 the boundary surface of the inner hose 110. The flange 159 of the clamping sleeve 155 is surrounded by an insulating material 160 and a protective jacket 161.

In the embodiment of FIG. 21 it is shown that the inner hose 110 has a curved path within the (straight) outer hose 111, the inner hose 110 being connected to the outer hose 111 at the positions of the flanges 116, 116' 117, 117' and 124, 124', 125, 125' via the spacers 130, 130'. This allows elongation and contraction of the inner hose relative to the outer hose.

In the wall 162 of the outer hose 111 a passage 163 is provided, connected to a pump 164 for instance for circulation of air, noble gases and the like in the space 127.

FIG. 22 shows a buoyancy module 132 attached to the flange 134 via an external spacer member 133. FIG. 23 shows a buoyancy module 136 attached to the outer hose 111 via an external spacer member 135. Placing the buoyancy modules at a distance from the elastomeric and/or plastic outer hose 111 avoids the outer hose 111 from locally becoming too cold such that it goes through a crystalline phase and hence would become brittle (as would be the case for instance a rubber hose). This would cause irreparable damage to the outer hose. By adding the floatation in such a way that ambient water can uniformly heat up the outer hose, the problem of local cooling can be avoided. The buoyancy modules which allow uniform temperature distribution may take several shapes, for instance doughnut-shaped buoyancy modules attached to the outer hose at intervals. The modules are placed at a radial distance from the outer hose to allow uniform water contact along its length.

The invention claimed is:

1. A method of constructing a cryogenic transfer hose, comprising:
   providing a first and second hose segment each having an inner and outer hose, compressed fibrous or porous material between the inner and outer hoses and a connecting flange at an end part,
   interconnecting the connecting flanges of the first and second segments, and
   increasing the air pressure of the fibrous or porous material in the first and second segments after interconnection.

2. The method of constructing the cryogenic transfer hose, according to claim 1, further comprising:
   providing a fibrous or porous or material around at least two inner hoses,
   providing an air tight film around the fibrous or porous material and placing said film in an airtight configuration around each inner hose
   removing air from the airtight enclosure for reduction of a diameter of the fibrous or porous material by compression,
   placing the inner hoses, the compressed fibrous or porous material and the film material into a respective outer hose at reduced pressure, and
   increasing the air pressure of the fibrous or porous material to allow it to expand, prior to or after,
   interconnecting the hose segments formed of coaxial inner and outer hoses with compressed fibrous or porous material in between.

3. The method of constructing the cryogenic transfer hose according to claim 1, comprising the outer hose is arranged around the inner hose in a concentric manner and a spacer member bridging an annular gap between the inner and outer hoses, a fibrous insulation material forming a three dimensional matrix of fibres being comprised in the annular gap, wherein the outer hose comprises an elastomeric and/or a plastic material, the fibrous material being contiguous overall best a part of the length of the hoses with the inner and outer hose and forming a spacer member.

4. The method of constructing the cryogenic transfer hose according to claim 3, wherein over a length of at least 0.4 m no other spacer element other than the fibrous material extends radially from a contacting position on the inner hose to a contacting position on the outer hose.

5. The method of constructing the cryogenic transfer hose according to claim 3, wherein the fibrous material is distributed along the inner hose in a non uniform manner so that in length direction there are areas of high density and low density fibrous material.

6. The method of constructing the cryogenic transfer hose according to claim 3, wherein the fibrous material comprises fibrous material of different densities and characteristics.

7. The method of constructing the cryogenic transfer hose according to claim 1, wherein flexible fibrous material is placed between high density stiff fibrous material.

8. The method of constructing the cryogenic transfer hose according to claim 1, the fibrous material being elastically compressible in a radial direction by between 1% and 10% at exertion of a force of between 5 and 50 kN/m on the inner hose.

9. The method of constructing the cryogenic transfer hose according to claim 1, wherein the fibrous material is elastically elongatable in a length direction of the hose by at least 10%.

10. The method of constructing the cryogenic transfer hose according to claim 1, wherein the fibrous material has at least over a length of 0.4 m a density of 70 kg.m−3 and an open volume of 93%.

11. The method of constructing the cryogenic transfer hose according to claim 1, wherein the hose having a bend radius of four times the diameter of the inner hose.

12. The method of constructing the cryogenic transfer hose according to claim 1, wherein the outer hose having a heat transfer coefficient of between 0.2 and 1.0 Wm−1K−1, preferably about 0.4 Wm−1K−1.

13. The method constructing the cryogenic transfer hose according to claim 1, wherein the fibrous material is surrounded by an airtight layer between the outer hose and the material.

14. The method of constructing the cryogenic transfer hose according to claim 1, wherein the fibrous material comprising a fleece material.

15. The method of constructing the cryogenic transfer hose according to claim 1, wherein the fibrous material comprising a fleece and felt material.

16. The method of constructing the cryogenic transfer hose according to claim 1, wherein the outer hose comprising a fibre and/or metal reinforced elastomeric and/or a plastic material.

17. The method of constructing the cryogenic transfer hose according to claim 1, wherein the inner hose comprising a helically wound reinforcement wire, and/or a corrugated steel pipe.

18. The method of constructing the cryogenic transfer hose according to claim 1, wherein the pressure between the inner and outer hose is substantially equal to the pressure outside the outer hose.

19. The method of constructing the cryogenic transfer hose according to claim 1, wherein the fibrous material comprising a strip-shaped fibrous sheet material which is wound around the inner hose.

20. The method of constructing the cryogenic transfer hose according to claim 4, wherein the fibrous material is distributed along the inner hose in a non uniform manner so that in length direction there are areas of high density and low density fibrous material.

21. The method of constructing the cryogenic transfer hose according to claim 4, wherein the fibrous material comprises fibrous material of different densities and characteristics.

22. The method of constructing the cryogenic transfer hose according to claim 2, wherein flexible fibrous material is placed between high density stiff fibrous material.

23. The method of constructing the cryogenic transfer hose according to claim 2, wherein the fibrous material being elastically compressible in a radial direction by between 1% and 10% at exertion of a force of between 5 and 50 kN/m on the inner hose.

24. The method of constructing the cryogenic transfer hose according to claim 2, wherein the fibrous material is elastically elongatable in a length direction of the hose by at least 10%.

25. The method of constructing the cryogenic transfer hose according to claim 2, wherein the fibrous material has at least over a length of 0.4 m a density of 70 kg.m−3 and an open volume of 93%.

26. The method of constructing the cryogenic transfer hose according to claim 2, wherein the hose having a bend radius of four times the diameter of the inner hose.

* * * * *